United States Patent
Kusters (10) Patent No.: US 7,984,864 B2
(45) Date of Patent: Jul. 26, 2011

(54) DEVICE FOR DESTROYING SHEET MATERIAL

(75) Inventor: Gerardus Jacobus Marie Kusters, Velden (NL)

(73) Assignee: Syntech Holdings, B.V., Venlo (NL)

( * ) Notice: Subject to any disclaimer, the term of this patent is extended or adjusted under 35 U.S.C. 154(b) by 40 days.

(21) Appl. No.: 12/520,373

(22) PCT Filed: Dec. 21, 2007

(86) PCT No.: PCT/NL2007/000329
§ 371 (c)(1),
(2), (4) Date: Jul. 10, 2009

(87) PCT Pub. No.: WO2008/078984
PCT Pub. Date: Jul. 3, 2008

(65) Prior Publication Data
US 2010/0084495 A1    Apr. 8, 2010

(30) Foreign Application Priority Data
Dec. 22, 2006  (NL) ..................................... 1033116

(51) Int. Cl.
*B02C 18/22* (2006.01)
(52) U.S. Cl. ............. 241/30; 241/81; 241/224; 241/236
(58) Field of Classification Search .................. 241/100, 241/236, 36, 30, 101.5, 224, 81
See application file for complete search history.

(56) References Cited

U.S. PATENT DOCUMENTS

| 1,901,508 | A |   | 3/1933  | Gutberlet ....................... 406/198 |
| 4,166,030 | A | * | 8/1979  | Lewis et al. ................... 209/534 |
| 4,453,286 | A |   | 6/1984  | Wieland .......................... 15/313 |
| 4,878,626 | A | * | 11/1989 | Leuthold et al. ................ 241/57 |
| 4,964,579 | A | * | 10/1990 | Strohmeyer .................. 241/100 |
| 5,012,932 | A |   | 5/1991  | Omura et al. ................. 209/534 |
| 5,167,374 | A | * | 12/1992 | Strohmeyer .................... 241/36 |
| 5,188,301 | A | * | 2/1993  | Hasegawa ....................... 241/33 |
| 5,464,162 | A |   | 11/1995 | Kusters .......................... 241/36 |
| 5,473,114 | A |   | 12/1995 | Vogel ............................. 174/47 |
| 5,649,627 | A | * | 7/1997  | Wako ........................... 209/534 |

FOREIGN PATENT DOCUMENTS

| DE | 20 42 025  | 3/1972  |
| EP | 0 302 458  | 2/1989  |
| EP | 1 195 202  | 4/2002  |
| EP | 1 393 809  | 3/2004  |
| GB | 1 302 003  | 1/1973  |
| GB | 2 081 200  | 2/1982  |
| JP | 58 078 915 | 5/1983  |
| JP | 58 212521  | 12/1983 |
| JP | 04 082984  | 3/1992  |
| NL | 9300706    | 11/1994 |

* cited by examiner

*Primary Examiner* — Mark Rosenbaum
(74) *Attorney, Agent, or Firm* — Roberts & Roberts, LLP (57) ABSTRACT

The invention provides a device for destroying sheet material, comprising shredding means (2) for shredding the sheet material and a feed conveyor system (3) for feeding sheet material to be destroyed to the shredding means from a feed location, wherein the feed conveyor system is arranged for feeding sheet material to be destroyed to the shredding means from a number of different feed locations (4). The invention further provides a system for sorting and destroying sheet material.

24 Claims, 8 Drawing Sheets

DEVICE FOR DESTROYING SHEET MATERIAL

The present invention relates to a device for destroying sheet material, comprising shredding means for shredding the sheet material and a feed conveyor system for feeding sheet material to be destroyed to the shredding means from a feed location. Within the context of the present invention, the term sheet material is understood to mean thin, flexible, rectangular material such as in particular sheets of paper, which independently carry information and which in that sense independently have a function. In particular banknotes are considered to be sheet material.

A device as referred to in the introduction is described in Dutch document NL 9300706 (laid open to public inspection). In this known device, which is intended for destroying bundled sheet material, use is made of a conveyor belt. Disposed at an upstream end of said conveyor belt is a feed location, where bundles of sheet material to be destroyed are manually placed on the conveyor belt. After being transported by the conveyor belt, the bundles fall off the conveyor belt at the downstream end onto a pre-cutting device, which cuts the sheet material into narrow strips. Downstream of said pre-cutting device, the narrow strips are sucked into a main cutting device via a suction pipe by means of a fan. The strips are subsequently shredded further by the main cutting device.

The bundles of sheet material that are processed in the above-described prior art may be bundles of banknotes that have been taken out of circulation. Such banknotes can be selected in an automated manner and be bundled by means of suitable devices. An example of such a device is marketed under the trade name Cobra® by the firm of De La Rue. With such a sorting device, bundles of banknotes to be checked are manually placed in the device, after which the sorting device checks the banknotes one by one for various aspects. The known device sorts out banknotes that do not meet specific criteria into a separate bundles of banknotes to be destroyed. Such a bundle can subsequently be transferred to a shredding machine as described in NL 9300706. Such a procedure is somewhat susceptible to fraud, which is a major drawback for central banks that use such devices. It is partially for that reason that it is also known to combine the Cobra sorting device with a shredding device which directly connects to the sorting device. Said shredding device directly takes over the banknotes to be destroyed from the sorting device and transports said banknotes by means of conveyor belts to shredding means that destroy the banknotes. An important advantage of such a configuration is the fact that the rejected banknotes are destroyed shortly after the moment of rejection, and that without human interference. A significant drawback, however, is the cost involved in using such a configuration, in particular if one realises that the known sorting devices are rarely used individually but usually in groups of, for example, six such sorting devices.

The object of the present invention is to provide a device as referred to in the introduction which enables a more efficient use of the device in question. In order to accomplish that object, the device according to the present invention is characterised in that the feed conveyor system is arranged for feeding sheet material to be destroyed to the shredding means from a number of different feed locations. The use of a number of different feed locations makes it possible to feed material to the device according to the invention from different sources. Such sources may be formed by sorting machines as described before, or different types of machines, for example counting machines. On the other hand, said feeding of sheet material to be destroyed at a feed location may also take manually.

As an aside, it is noted that Japanese publication JP 04 082984 A describes a system in which paper is locally shredded into scraps in various buildings A1-A5, which scraps are subsequently transported to a "scrap collecting centre". From said scrap collecting centre, the material is transported to a wet pulper by means of a mechanical conveyor. In the system as described in EP-A1-1 393 809, shredding of documents likewise takes place locally on different floors of a building, after which the shreds are transported to a central collecting location via suction pipes. Consequently, neither system employs common shredding means for shredding paper from different feed locations, on the contrary, in contrast to the present invention shredding of the paper takes place decentralised at each of the feed locations.

In particular, but not exclusively, for use in situations in which items of sheet material are fed individually at a feed location, it is preferable if the feed conveyor system comprises a suction pipe system. The use of a suction pipe system, in which sheet material to be destroyed is sucked from a feed location to the shredding means, makes it possible to carry out the required transportation of sheet material to be destroyed between a feed location and the shredding means with relatively simple means.

To make it possible to use a relatively large number of feed locations, without this leading to an accumulation of suction pipes near the shredding means, it is preferable if the suction pipe system comprises a main suction pipe as well as a number of the sub-suction pipes, which each open into the main pipe at a downstream end and at the upstream end of which an associated feed location is provided.

The preferred embodiment, in which at least some of the sub-suction pipes open into the main suction pipe in, at least substantially, the same direction, has the important advantage that no collisions will take place between sheet material to be destroyed that is being fed to the main suction pipe from various feed locations. Such collisions might lead to obstacles being formed both for and by the sheet material to be destroyed. In the present preferred embodiment it is conceivable, for example, for the sub-suction pipes to open into the main suction pipe at locations located beside one another or above one another.

In particular for the purpose of processing individual items of sheet material, such as individual banknotes, it is preferable if the suction pipe system has an elongate cross-section, at least at a feed location, in which case the length-width ratio of said elongate cross-section is more preferably at least 5. Such a cross-sectional shape conforms to the shape of a flat item of sheet material, so that the available suction capacity is utilised as efficiently as possible.

For constructional reasons it is preferable in that connection if the suction pipe system has a rectangular cross-section at least at a feed location.

According to one preferred embodiment, which is important for practical reasons, the suction pipe system has an inlet opening at least at a feed location for feeding sheet material to be destroyed to the suction pipe system via said inlet opening, as well that at least one air hole for sucking in false air. The use of said at least one air hole, by which falls air is sucked in, can significantly reduce the risk of sheet material sticking to an inner wall of the suction pipe system, as it were, as a result of vacuum being created between the inner wall and the sheet material.

More specifically it is preferable in that regard if the suction pipe system comprises a feed pipe at a feed location, which feed pipe has its inlet opening at an upstream end and which extends at least partially within a suction pipe of the suction pipe system, said at least one air hole being provided between said feed pipe and said suction pipe. Thus an embodiment in which sheet material is prevented from sticking to the inner wall of a portion of the suction pipe system whilst retaining the aforesaid advantage of false air being sucked in is provided in a constructionally simple manner.

It is furthermore preferable in that regard if spacers are provided for keeping the supply pipe and the suction pipe spaced apart, so that a well-defined situation with a predictable behaviour of the sheet material is obtained.

To facilitate the actual feeding of sheet material to the suction pipe system, another preferred embodiment is characterised in that the suction pipe system is provided with a funnel-shaped feed element at least at a feed location for feeding sheet material to be destroyed to the suction pipe system via said funnel-shaped feed element, wherein furthermore preferably said funnel-shaped feed element is oriented horizontally, so that the intake of the sheet material can take place in horizontal direction, for example in a comparatively simple manner from a stack of sheet material.

To prevent the aforesaid risk of sheet material sticking to the inner side of the wall of the suction pipe system, it is furthermore preferable if the wall of at least a portion of the suction pipe forming part of the suction pipe system is provided with a profile, at least on the inner side. This preferred embodiment recognizes that the risk of sheet material sticking to a wall is greater when large surfaces are involved. The fact is that if a profile is used, the risk of a vacuum being created between a wall of a suction pipe and sheet material to be destroyed will be significantly smaller.

Alternatively, or in combination therewith, the risk of sheet material sticking to the inner side of the wall of the suction pipe system can also be reduced if the wall of at least a portion of a suction pipe forming part of the suction pipe system is provided with a coating, at least on the inner side. Such a coating might be a Teflon coating, for example, so as to reduce the frictional forces between sheet material to be destroyed and the inner wall of the suction pipe system.

The suction pipe system preferably comprises a shut-off valve for shutting off a path between a feed location and the shredding means within the suction pipe system. Shutting off a specific path within the suction pipe system by means of a shut-off valve makes it possible to increase the available suction capacity within another path between another feed location and the shredding means. In this way the required suction capacity can be reduced.

Preferably, a shut-off valve is provided between each of the feed locations and the shredding means. This results in a great flexibility in obtaining a required suction capacity for a specific path between a feed location and the shredding means within the suction pipe system.

Furthermore preferably, further air holes are provided in the wall of at least a portion of a suction pipe forming part of the suction pipe system. Such holes make it possible to suck in false air, which false air prevents or at least reduces the risk of sheet material sticking to the inner side of the wall of the suction pipe system at locations where this is desired.

To check the number of items of sheet material that are destroyed by means of the device according to the invention, sensor means are preferably provided for detecting sheet material to be destroyed during transportation thereof to the shredding means by the feed conveyor system. This advantage is relevant in particular if the sheet material consists of valuable papers, for example banknotes.

In order to be able to visually follow the transportation by the feed conveyor system of the material to be destroyed, it is preferable if the wall of at least a portion of a suction pipe forming part of the suction pipe system is transparent. For example, transparent windows may be used at "critical" positions where a blockage might occur.

A highly reliable destruction of the sheet material can be realised if the shredding means comprise at least one cutting knife.

To ensure an unobstructed transportation of the material up to the shredding means, it is preferable if the feed conveyor system comprises a suction source disposed downstream of the shredding means.

The present invention further relates to a system for sorting and destroying sheet material, which system comprises a device according to the invention as described in the foregoing, as well as a sorting device for sorting sheet material disposed at least two feed locations, which sorting device is arranged for selecting sheet material to be destroyed and supplying the sheet material to be destroyed to the associated feed location. Within such a system, a very advantageous utilisation of a device according to the invention is realised, in which human interference between the sorting of the sheet material and the destruction thereof is not required, which is advantageous for reasons of fraud prevention.

The present invention finally relates also to a method for destroying sheet material, comprising the steps of:
A feeding sheet material to shredding means from a number of different feed locations,
B having the shredding means shred the sheet material only when the sheet material from said number of different feed locations arrives at said shredding means.

Advantages of such a method have already been discussed in the foregoing in the explanation of the device according to the invention.

Preferably, individual items of sheet material are fed in succession during step A, making it possible to realise a readily controllable process in which the risk of trouble is small.

In addition, the preceding preferred embodiment very advantageously makes it possible to check the amount of sheet material being destroyed. Within this framework it is preferable if the individual items of sheet material from the number of different feed locations are counted downstream of the number of different feed locations and upstream of the shredding means.

The invention will now be explained in more detail by means of a description of a preferred embodiment of the present invention and a number of variants thereof. In the description, reference will be made to the following figures:

FIGS. 3a and 3b are more detailed views of possible embodiments of the suction pipe of FIG. 2a;

FIGS. 4a and 4b are more detailed views of the inner side of the wall of the suction pipe of FIG. 2a;

Figure 1A:
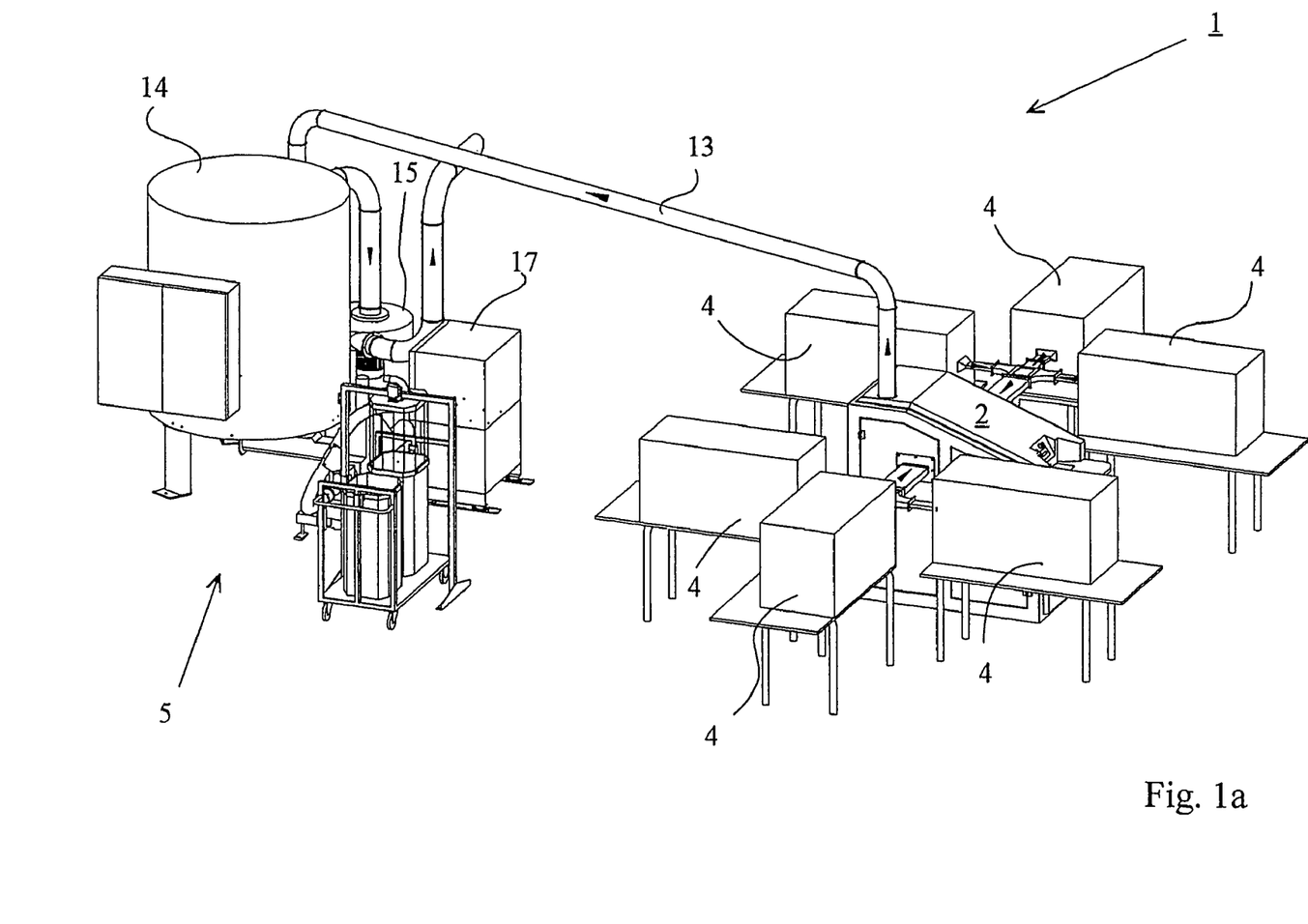
FIGS. 1a and 1b are an isometric top plan view and a perpendicular top plan view, respectively, of a preferred embodiment of a system for sorting and destroying sheet material according to the invention, comprising a device according to the invention for destroying sheet material.
Figure 1B:
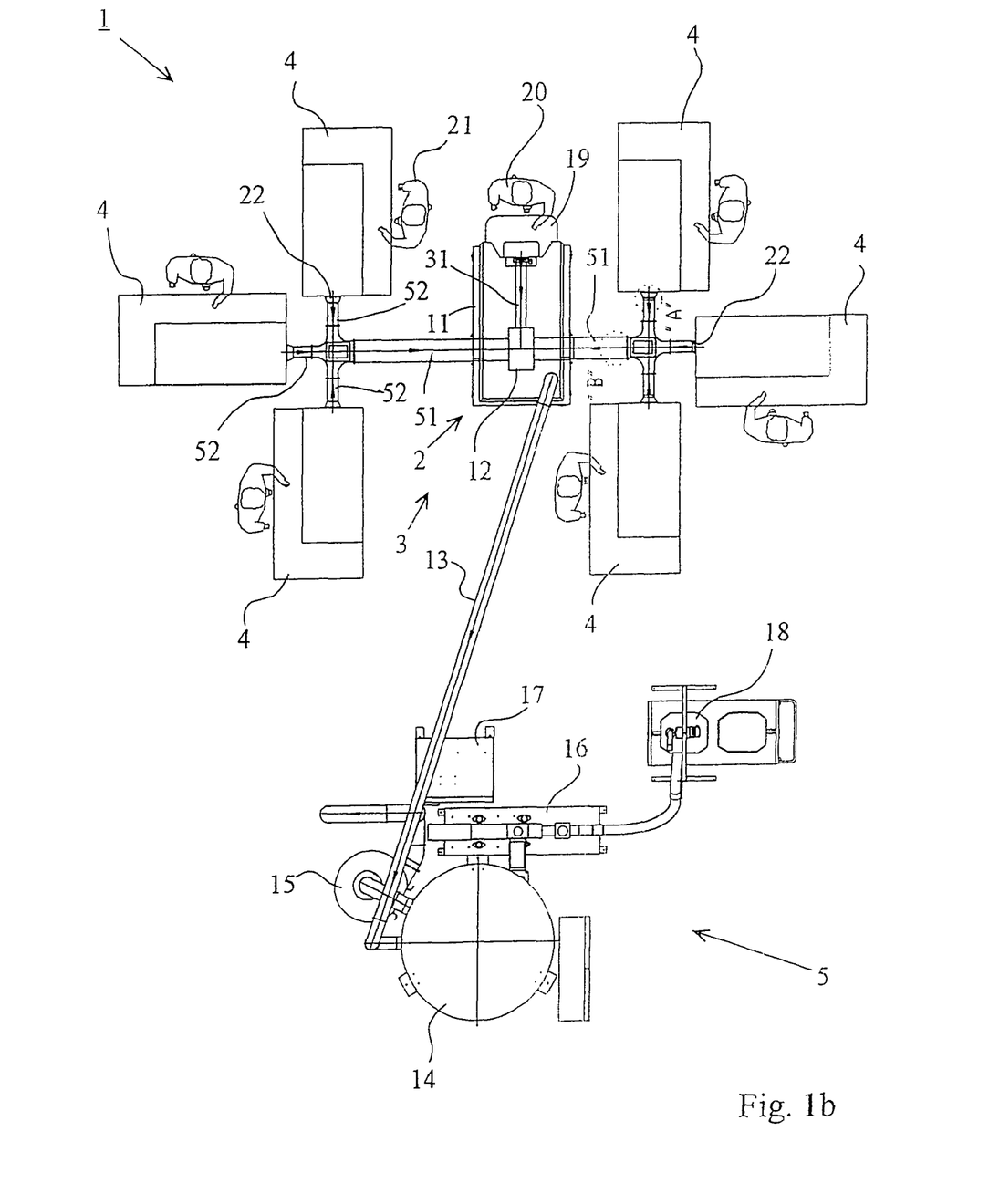

FIGS. 1a and 1b show a system 1 by which sheet material, such as valuable papers, more specifically banknotes, can both be sorted and, insofar as necessary, be destroyed. The system 1 essentially comprises a shredding device 2, including a feed conveyor system 3, six sorting devices 4 and a collecting device 5. The core of the present invention is in particular formed by the feed conveyor system 3. Shredding means such as the shredding device 2, sorting devices such as the sorting devices 4 and collecting devices such as the collecting device 5 are already known to the skilled person and will only be explained hereinafter insofar as this is necessary for a correct understanding of the present invention.

The shredding device 2 comprises a housing 11 with a funnel 12 disposed within said housing. Disposed below the funnel 12 are shredding means, for example in the form of rotating knives by means of which sheet material that falls into the funnel 12 is shredded. Such shreds are discharged to the collecting device 5 via a discharge suction pipe 13, at which collecting device 5 the shreds are collected in a container 14. The collecting device 5 comprises a fan 15 for generating a sub-atmospheric pressure in the discharge suction pipe 13, which fan also generates a sub-atmospheric pressure downstream of the aforesaid shredding means. It is furthermore noted, unnecessarily, in that connection that the collecting device 5 further comprises a press 16 with an associated hydraulic unit 17, by means of which the paper shreds are compressed into briquettes, which are eventually collected in a package 18.

As already indicated before, the sorting devices 4 are already known to those skilled in the art as well. By way of example reference is made to sorting devices of the type Cobra® of the firm of De La Rue. With such sorting devices 4, operator 21 presents stacked sheet material, such as a valuable papers, more specifically banknotes, to the sorting device 4, which sorting device subsequently assesses the items of sheet material one by one on the basis of predetermined criteria and sorts the valuable papers in dependence on said assessment into inter alia a group of rejected valuable papers that are to be destroyed. The sorting device 4 presents said group of rejected papers to a discharge location 22 outside the housing thereof.

A shredding device at least substantially corresponding to the shredding device 2 is marketed by the firm of Kusters Engineering B.V. under type number RDS-100. Present at the front side of the housing 11 is a worktop 19, where an operator 20 can present sheet material to be destroyed via a hatch (not shown in detail), to which hatch a suction pipe 31 connects, which suction pipe opens above the funnel 12.

Figure 2A:
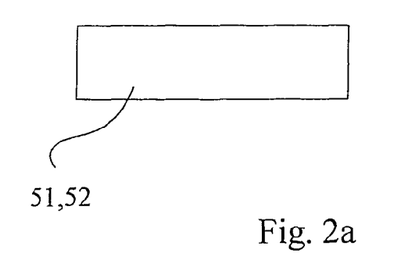
FIG. 2a is a cross-sectional view of a suction pipe forming part of the device shown in FIGS. 1a and 1b.
Figure 2B:
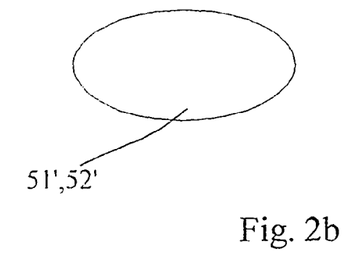
FIG. 2b is a cross-sectional view of an alternative suction pipe.
Figure 3A:
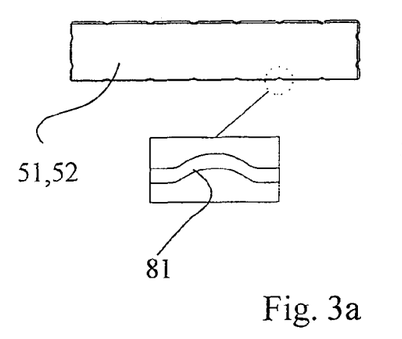
Figure 3B:
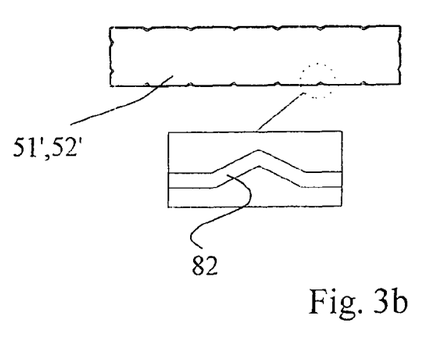
Figure 4A:
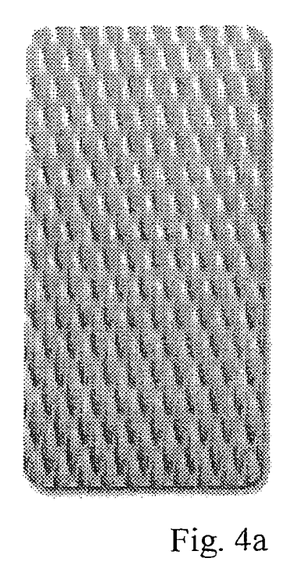
Figure 4B:
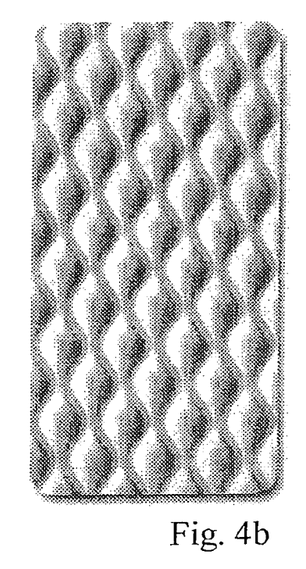

The feed conveyor system 3 comprises a suction pipe system comprising two main suction pipes 51 and three sub-suction pipes 52 for each main suction pipe 51. The main suction pipes 51 and the sub-suction pipes 52 have a rectangular cross-section, as is shown in FIG. 2a. Within the framework of the present invention it would also be possible to use alternative elongate cross-sectional shapes for the suction pipes 51, 52 in question, for example oval cross-sectional shapes as shown in FIG. 2b, without excluding the possibility of using a non-elongate cross-sectional shape for the suction pipes 51, 52.

The main suction pipes 51 extend through an opening in a side wall of the housing 11 and, just like the suction pipe 31, open above the funnel 12 within the housing 11. The sub-suction pipes 52 connect to the associated main suction pipe 51 via a cross-shaped connecting pipe 53. Provided in the centre of the cross shape, at the upper side of the connecting pipe 53, is a window 59 of a transparent material, through which the interior of the connecting pipe 53 is visible.

Figure 10A:
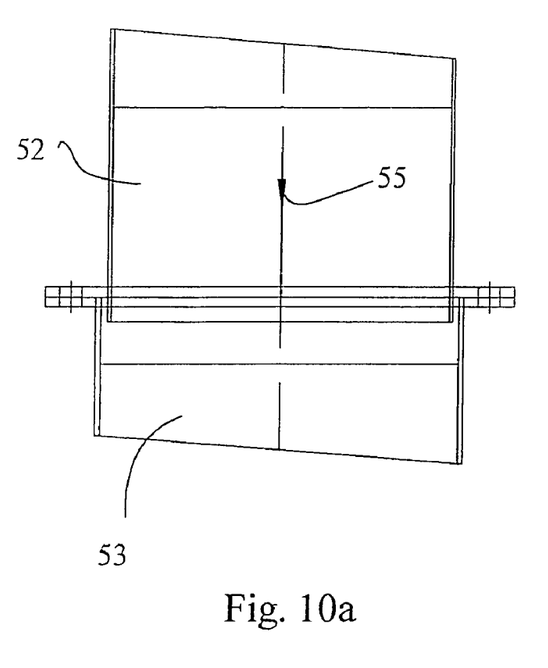
FIGS. 10a and 10b are a top plan view and a side view, respectively, of a transition within the suction pipe system.
Figure 10B:
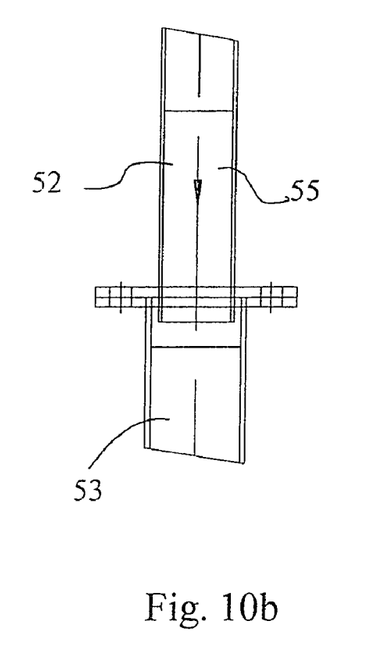

The connection between the connecting pipe 53 and a sub-suction pipe 52 is shown in more detail in FIGS. 10a and 10b. A flanged joint 54 is used for the connection between the sub-suction pipes 52 on the one hand and the cross-shaped connecting suction pipe 53 on the other hand. Furthermore it is important to note that the dimensions of the connecting suction pipe 53 at the location of the connection are larger than those of the sub-suction pipes 52, which makes it possible to have the sub-suction pipes 52 extend within the connecting suction pipe 53 to a limited extent. Such a configuration has the important advantage that no edges are formed, at least in the suction direction 55 towards the shredding device 2, on which sheet material to be destroyed might catch.

Figure 5:
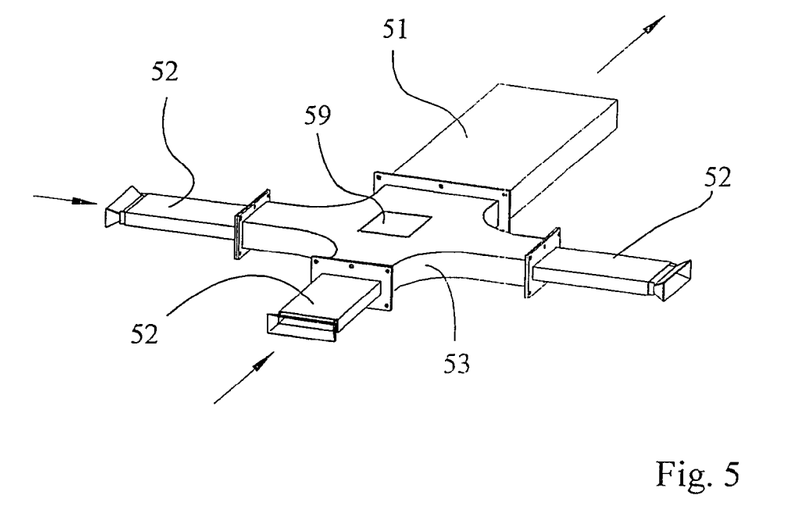
FIG. 5 is an isometric view of a junction of a suction pipe system forming part of the device shown in FIGS. 1a and 1b.
Figure 6A:
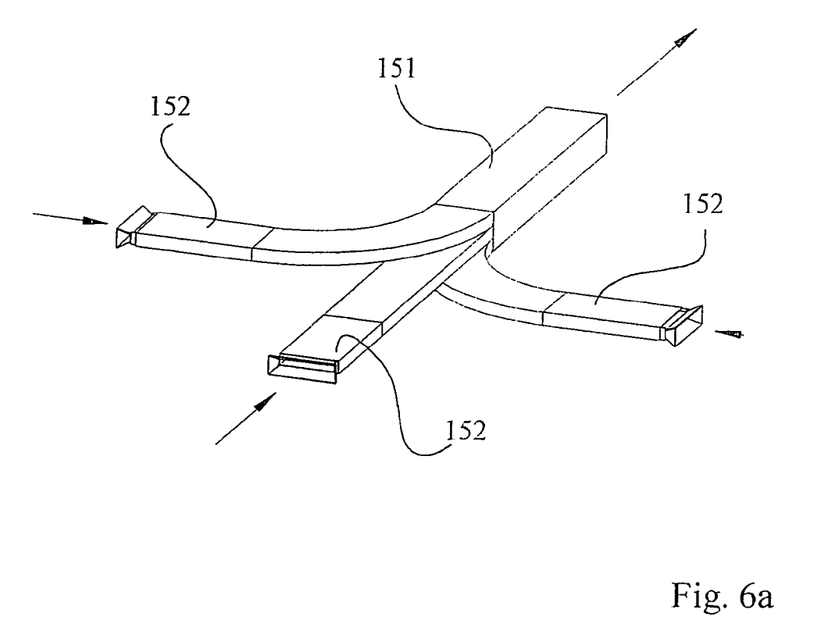
FIGS. 6a-6c show alternative embodiments of a junction as shown in FIG. 5.
Figure 6B:
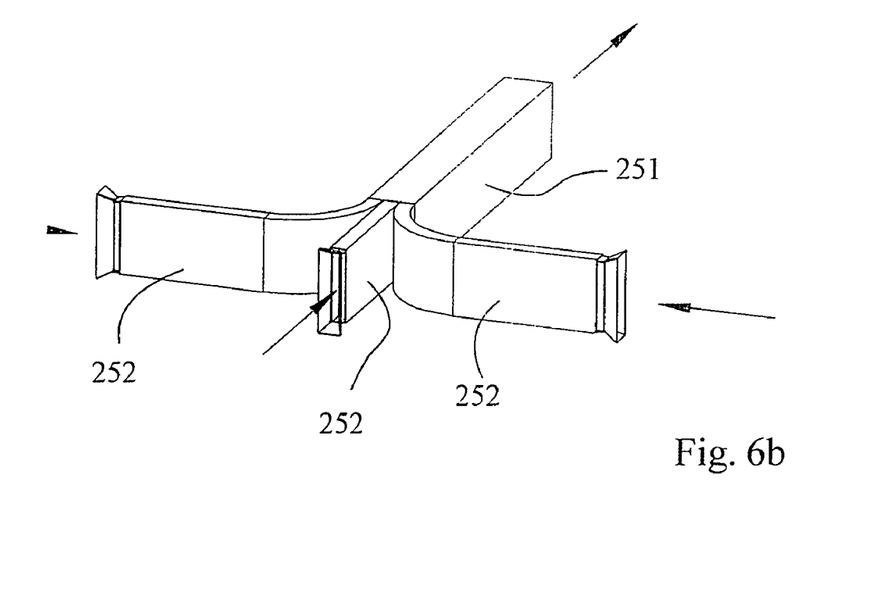
Figure 6C:
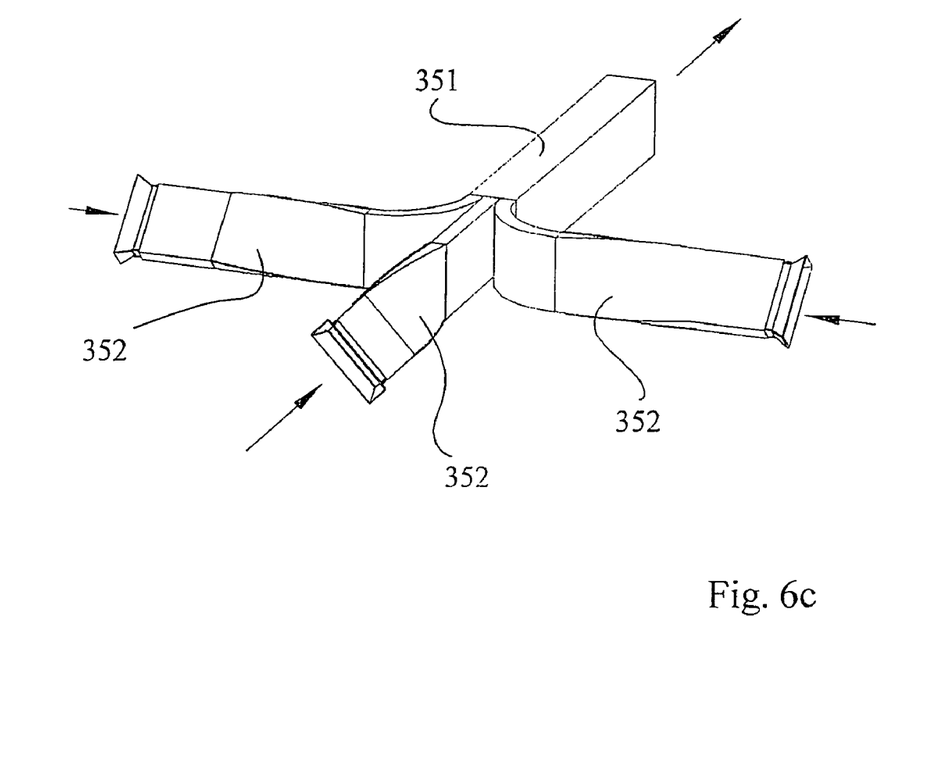

FIGS. 6a-6c show three alternative embodiments for connecting sub-suction pipes 152, 252, 352 to main suction pipes 151, 251, 351, respectively. The sub-suction pipes 152 open one above another into the main suction pipe 151. The sub-suction pipes 252, which have a vertical orientation, open beside each other into the main suction pipes 251. The twisted sub-suction pipes 352 likewise open beside each other into the main suction pipe 351 in a vertical orientation. The advantage of the configurations as shown in FIGS. 6a-6c, in which no use is made of a connecting suction pipe 53 as shown in FIG. 5, is that sheet material from different sub-suction pipes will not collide with each other, or at least that the risk of such collisions is considerably smaller, so that the risk of sheet material blocking up within the suction pipe system, for example within the connecting suction pipe 53, is significantly reduced.

Figure 7A:
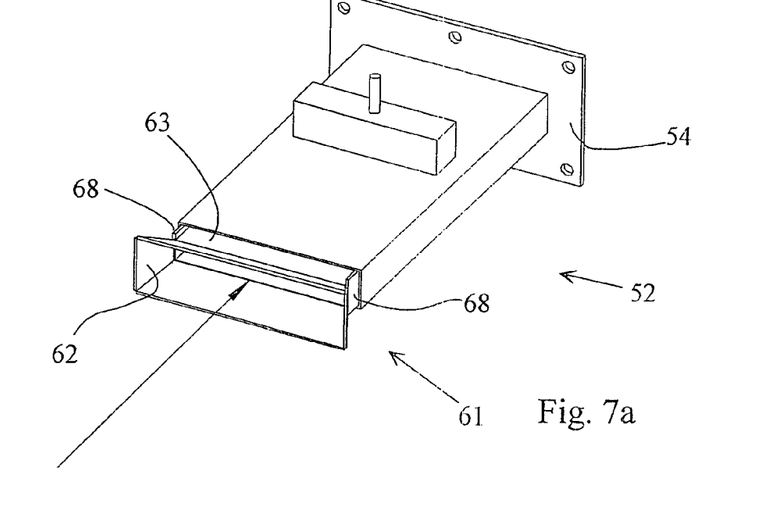
FIGS. 7a-7c are an isometric top plan view, a top plan view and a longitudinal sectional view along the line VIIc in FIG. 7b, respectively, of a portion of the suction pipe system at a feed location.
Figure 7B:
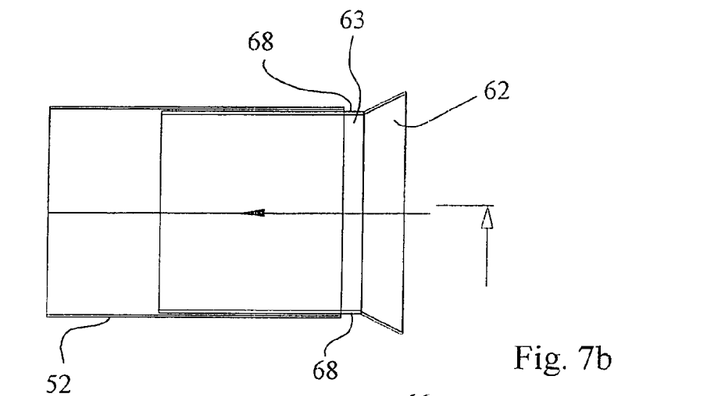
Figure 7C:
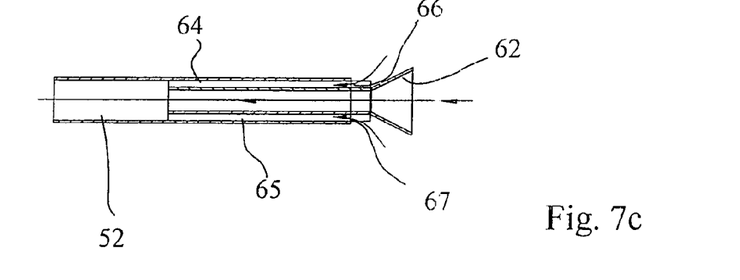

FIGS. 7a-7c show the inlet side of the sub-suction pipes 52 in more detail. An insertion element 61 is inserted into said ends. The insertion element 61 comprises a funnel portion extending outside the sub-suction pipe 52, which connects to a feed pipe portion 63. The feed pipe portion 63 has a rectangular cross-sectional shape, whose length (i.e. in horizontal direction) has been selected so that the feed pipe portion 63 can be inserted into the sub-suction pipe 52 with a tight fit. The width of the feed pipe portion 63 (i.e. in vertical direction), however, has been selected so much smaller than the width of the sub-suction pipe 52 that a certain clearance is present between the upper side and the lower side of the seat pipe portion 63 on the one hand and the upper wall and the lower wall of the sub-suction pipe 52 on the other hand, which clearances function as air ducts 64, 65. Said air ducts 64, 65 have an inlet opening 66, 67 at the end of the sub-suction pipe 52 above and below, respectively, that part of the feed pipe portion 63 which connects to the funnel portion 62, via which inlet opening false air can be sucked into the air ducts 64, 65, which false air will eventually be introduced into the remaining portion of the sub-suction pipe 52 at the location beyond the feed pipe portion 63. To give the air ducts 64, 65 a specific height, preferably the same height, the height of the side walls 68 of the seat pipe portion 63 has been selected so that it fits precisely within the height of the sub-suction pipe 52.

The funnel portion 62 makes it possible in a reliable manner to present individual items of sheet material, such as individual banknotes, to the sub-suction pipe 52 for subsequent transportation to the shredding device 2 by the feed conveyor system 3.

Surprisingly, the use of the insertion element 61 appears to significantly reduce the risk of sheet material sticking to the upper wall or the lower wall of the sub-suction pipe 52. This risk results from the fact that a vacuum may be created between an item of sheet material and the inner side of the respective wall of the sub-suction pipe 52, which risk appears to exist also at the location where the sheet material is introduced. In order to further reduce the risk of material sticking as described above, it is preferable to provide the walls of the pipes 51, 52 of the suction pipe system with a profile, at least on the inner side thereof, as is shown in FIGS. 3a, 3b and 4a, 4b, to which end projections are used, for example round or oval projections 81, 82. Said profile reduces the risk of a vacuum being created between an item of sheet material and the wall in question.

Figure 8:
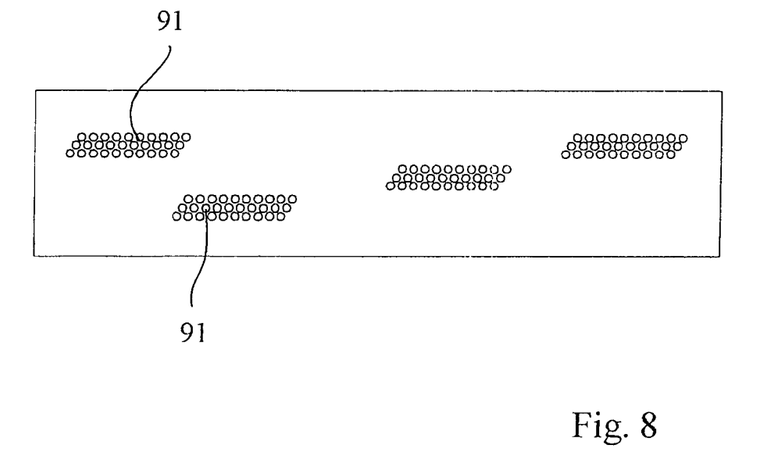
FIG. 8 is a top plan view of a portion of a suction pipe.

Another solution for reducing the risk of material sticking can be found in (locally) providing holes 91 in the wall of a suction pipe of the suction pipe system, via which holes false air can be sucked in. Said holes might be provided at those locations where in practice the risk of sticking appears to be greatest. According to further alternatives or combinations it is also possible to provide the inner side of the wall of a suction pipe with a suitable coating, for example of Teflon, which can reduce any frictional forces.

Figure 9A:
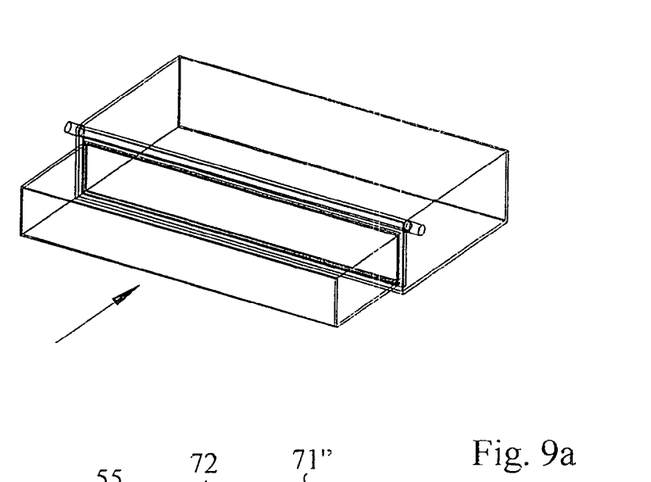
FIGS. 9a and 9b are an isometric transparent top plan view and the vertical longitudinal sectional view, respectively, of a portion of a suction pipe in the suction pipe system at the location of a shut-off valve.
Figure 9B:
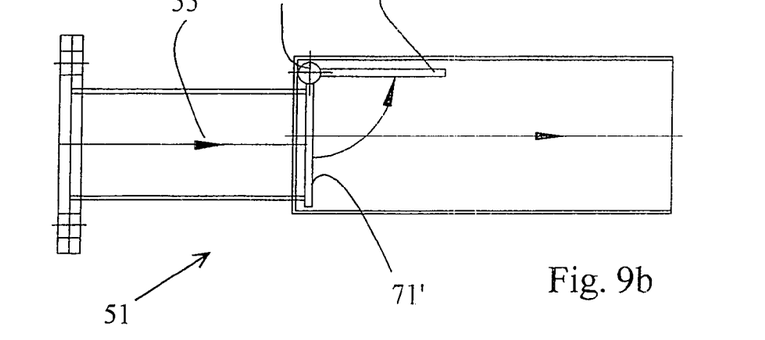

FIGS. 9a and 9b show the possibility of using a shut-off valve 71 which is mounted in a main suction pipe 51, but which in principle might also be mounted in a sub-suction pipe 52. The shut-off valve 71 is pivotable about a pivot axis 72 between a closed position 71' and an open position 71". In the open position 71", the shut-off valve 71 does not extend in line with the upstream portion of the main suction pipe 51, so that the shut-off valve does not form an obstruction to sheet material being transported in the direction of transport 55 by the main suction pipe 51. The advantage of closing the shut-off valve 71 in a main suction pipe 51 is that this makes it possible to increase the suction capacity in a remaining portion of the suction pipe system. This may be necessary or at least desirable, for example, at the moment when the operator 20 presents a bundle of sheet material to the shredding device 2 for transportation via the suction pipe 31.

The invention claimed is:

1. A system for sorting and destroying sheet material, comprising a device for destroying sheet material, comprising shredding means for shredding the sheet material and a feed conveyor system for feeding sheet material to be destroyed to the shredding means from a feed location, wherein the feed conveyor system is arranged for feeding sheet material to be destroyed to the shredding means from a number of different feed locations, and wherein the system comprises sorting devices for sorting sheet material which are disposed at at least two feed locations, which sorting devices are each arranged for selecting sheet material to be destroyed and supplying the sheet material to be destroyed to an associated feed location.

2. The system according to claim 1, wherein the feed conveyor system comprises a suction pipe system.

3. The system according to claim 2, wherein the suction pipe system comprises a main suction pipe as well as a number of sub-suction pipes, which each open into the main pipe at a downstream end and at the upstream end of which an associated feed location is provided.

4. The system according to claim 3, wherein at least some of the sub-suction pipes open into the main suction pipe in, at least substantially, the same direction.

5. The system according to claim 2 wherein the suction pipe system has an elongate cross-section.

6. The system according to claim 5, wherein the suction pipe system has a rectangular cross-section at least at a feed location.

7. The system according to claim 5 wherein the length-width ratio of said elongate cross-section is at least 5.

8. The system according to claim 2 wherein the suction pipe system has an inlet opening at least at a feed location for feeding sheet material to be destroyed to the suction pipe system via said inlet opening, as well as at least one air hole for sucking in false air.

9. The system according to claim 8, wherein the suction pipe system comprises a feed pipe at a feed location, which feed pipe has its inlet opening at an upstream end and which extends at least partially within a suction pipe of the suction pipe system, said at least one air hole being provided between said feed pipe and said suction pipe.

10. The system according to claim 9, wherein spacers are provided for keeping the supply pipe and the suction pipe spaced apart.

11. The system according to claim 2 wherein the suction pipe system is provided with a funnel-shaped feed element at least at a feed location for feeding sheet material to be destroyed to the suction pipe system via said funnel-shaped feed element.

12. The system according to claim 11, wherein said funnel-shaped feed element is oriented horizontally.

13. The system according to claim 2 wherein the wall of at least a portion of the suction pipe forming part of the suction pipe system is provided with a profile, at least on the inner side.

14. The system according to claim 2 wherein the wall of at least a portion of a suction pipe forming part of the suction pipe system is provided with a coating, at least on the inner side.

15. The system according to claim 2 wherein the suction pipe system comprises a shut-off valve for shutting off a path between a feed location and the shredding means within the suction pipe system.

16. The system according to claim 15. wherein a shut-off valve is provided between each of the feed locations and the shredding means.

17. A system according to claim 2 wherein further air holes are provided in the wall of at least a portion of a suction pipe forming part of the suction pipe system.

18. The system according to claim 2 wherein a wall of at least a portion of a suction pipe forming part of the suction pipe system is transparent.

19. The system according to claim 1 wherein sensor means are provided for detecting sheet material to be destroyed during transportation thereof to the shredding means by the feed conveyor system.

20. The system according to claim 1 wherein the shredding means comprise at least one cutting knife.

21. The system according to claim 2 wherein the feed conveyor system comprises a suction source disposed downstream of the shredding means.

22. A method for destroying sheet material, comprising the steps of
- A) selecting sheet material to be destroyed, which selecting is done by sorting devices disposed at each of a number of different feed locations, and supplying the sheet material to be destroyed to an associated feed location,
- B) feeding the sheet material to shredding means from a number of different feed locations by means of a feed conveyor system, and
- C) having the shredding means shred the sheet material only when the sheet material from said number of different feed locations arrives at said shredding means.

23. The method according to claim 22, wherein individual items of sheet material are fed in succession during step A.

24. The method according to claim 22, wherein individual items of sheet material from the number of different feed locations are counted downstream of the number of different feed locations and upstream of the shredding means.

* * * * *